United States Patent [19]

Smith

[11] 4,415,056
[45] Nov. 15, 1983

[54] HANDICAPPED-DRIVEN SIDECAR

[76] Inventor: Frederick A. Smith, 5410 E. Saginaw, Fresno, Calif. 93727

[21] Appl. No.: 329,691

[22] Filed: Dec. 11, 1981

[51] Int. Cl.³ .................................................. B62K 27/00
[52] U.S. Cl. ........................................ 180/210; 180/332; 180/DIG. 3; 280/203; 280/289 WC; 414/921
[58] Field of Search .......... 180/210, 322, 333, DIG. 3; 280/203, 289 WC; 414/921

[56] References Cited

U.S. PATENT DOCUMENTS

| | | | |
|---|---|---|---|
| 1,231,163 | 6/1917 | Jaggard | 180/210 |
| 3,204,791 | 9/1965 | Williams | 180/210 |
| 3,921,740 | 11/1975 | Forster | 180/907 |
| 4,221,276 | 9/1980 | Mitchell et al. | 280/203 |

Primary Examiner—Joseph F. Peters, Jr.
Assistant Examiner—Kenneth R. Rice
Attorney, Agent, or Firm—Lyon & Lyon

[57] ABSTRACT

A motorcycle/sidecar apparatus, the sidecar designed and constructed to accommodate therein a wheelchair and wheelchair occupant, the sidecar further outfitted with controls for operation of the throttling, braking and steering functions of the motorcycle by the wheelchair occupant in the sidecar who has only minimal elbow-flex motion capabilities.

11 Claims, 11 Drawing Figures

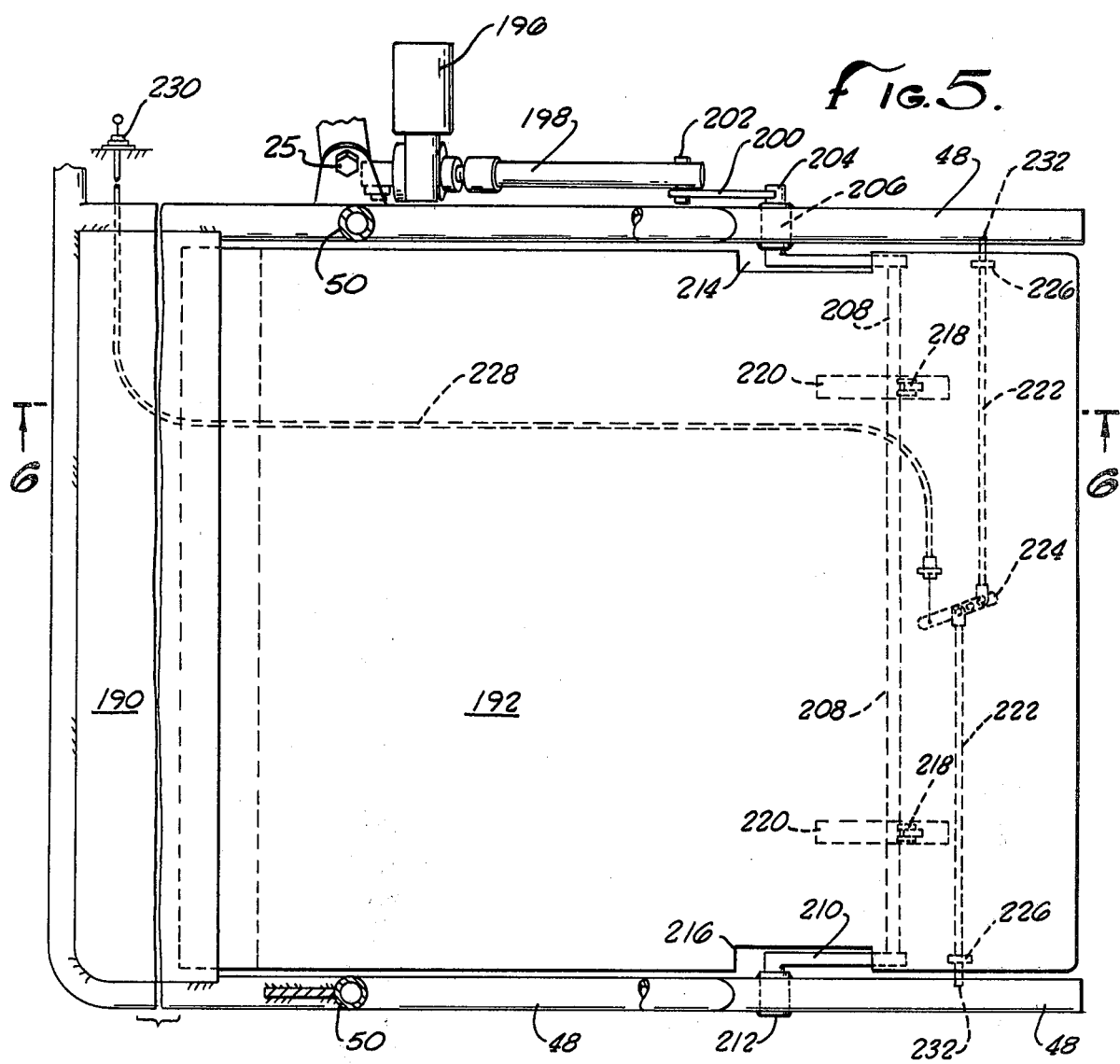
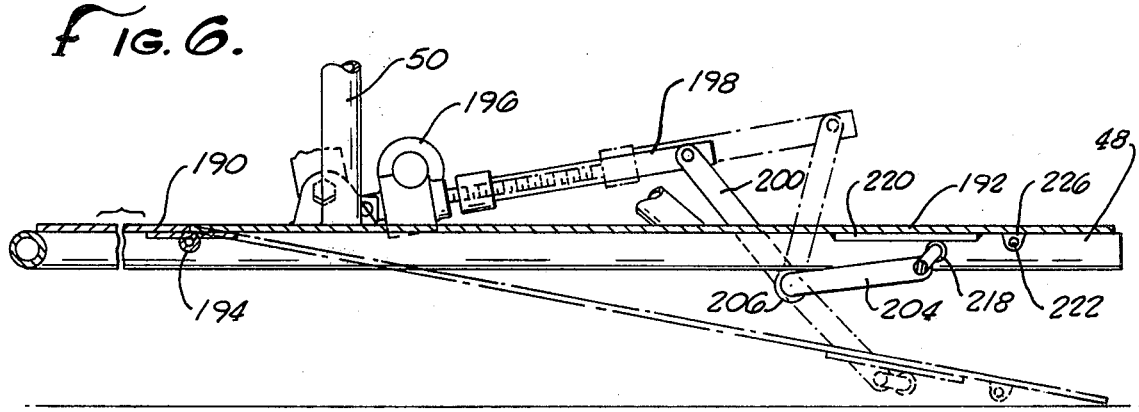

HANDICAPPED-DRIVEN SIDECAR

BACKGROUND OF THE INVENTION

The apparatus of this invention pertains to a motorcycle/sidecar apparatus which is occupied and operated by a wheelchair confined person. Representative of the prior art is U.S. Pat. No. 4,221,276.

One of the most serious obstacles which faces a wheelchair-confined person is that of distance. The world of the seriously handicapped can be tightly confined inasmuch as travel requires the assistance of one or more people and/or expensive equipment, such as a specially prepared van. The cost of such equipment and the cost and availability of such assistants limit many handicapped persons to a life largely confined to their home and environs.

This forced immobility and lack of independence contributes greatly to that feeling of helplessness and lack of self-esteem which many handicapped find to be more debilitating than even their physical problems.

There are, of course, degrees of physical impairment which requires wheelchair confinement. A paraplegic will typically have full use of the upper body and can perform normal functions of the fingers, hands, arms and shoulders. Much more seriously impaired in the quadraplegic, who will typically have only elbow-flex capabilities and will not have the full use of hands or fingers. As would be expected, the problems encountered by the quadraplegic are much greater than those facing the paraplegic. Many of the devices which will work for the paraplegic will not be useable by the quadraplegic. For example, the sidecar device disclosed in U.S. Pat. No. 4,221,276 merely relocates conventional motorcycle hand controls onto the sidecar. These conventional controls require that the operator have normal or nearly normal use of his hands and fingers. Accordingly, a quadraplegic would not be able to use the sidecar in U.S. Pat. No. 4,221,276.

It is therefore the object of this invention to provide a sidecar which may be attached to a conventional motorcycle, and which utilizes the conventional throttling and braking systems of the conventional motorcycle, but which are adapted for operation by a quadraplegic having no more than elbow flex movement capabilities.

SUMMARY OF INVENTION

The apparatus of this invention accomplishes the above and other objectives, in a sidecar/motorcycle adaptation wherein the sidecar is attached to a conventional motorcycle having an automatic transmission, hand operated brake and throttle controls and front fork assembly. The sidecar is designed and constructed to accomodate therein a conventional wheelchair and wheelchair occupant. The floor plate of the sidecar is hinged at its front to enable it to drop down to act as a ramp for the wheelchair. An electric motor operates to raise and lower the floor plate.

The wheel of the sidecar is outfitted with a rotary gear. An electric motor on the sidecar operates to turn the rotary gear, and hence the sidecar, in a rearward direction to give the apparatus a "reverse" gear.

To accomodate the minimal use of the arms of which the quadraplegic will be capable, the apparatus of this invention provides a unique system for the control of its steering, throttling and braking functions. The throttling and braking functions are performed by means of a single actuating bar. The bar is attached, by means of a pair of gears, to the conventional throttle control of the motorcycle which has been relocated on the sidecar. Moving the bar in a rotary direction through a small arc in a vertical plane causes the throttle to operate.

The braking function is accomplished with the same actuating bar. The conventional hand depressed motorcycle braking controls are relocated onto the sidecar. A linkage is attached to each such control and also to the actuating bar. Moving the bar laterally through a small arc in a horizontal plane causes the brake controls to be actuated. In sum, rotary movement of the actuating bar operates the throttle, lateral movement operates the brakes. Both of these movements are capable of execution by a typical quadraplegic.

The steering function is accomplished by means of a worm gear assembly and a steering bar on the side car. The handlebars of the conventional motorcycle are removed. The steering bar, when moved in a rotary direction, turns a worm gear, which in turn rotates a rotary gear. Via a system of linkages, this movement of the rotary gear cause the front fork assembly of the motorcycle to move from side to side, thereby controlling the direction in which the apparatus will travel.

DESCRIPTION OF THE FIGURES

FIG. 5 is a plan view of the floor portion of the sidecar, showing how the floor plate is hinged, and the electric motor, L-bar and connective linkage by which the floor plate is lowered to act as a ramp to allow the wheelchair to roll into the sidecar, and then raised to become the floor portion of the sidecar. Also shown is the locking device whereby the floor plate, after having been raised, is locked into position.

FIG. 6 is side view taken along line 6—6 in FIG. 5 showing how the floor plate is raised and lowered. The floor plate and connective hardware is shown in shadow in the lowered position.

DETAILED DESCRIPTION OF THE PREFERRED EMBODIMENT

Figure 1:
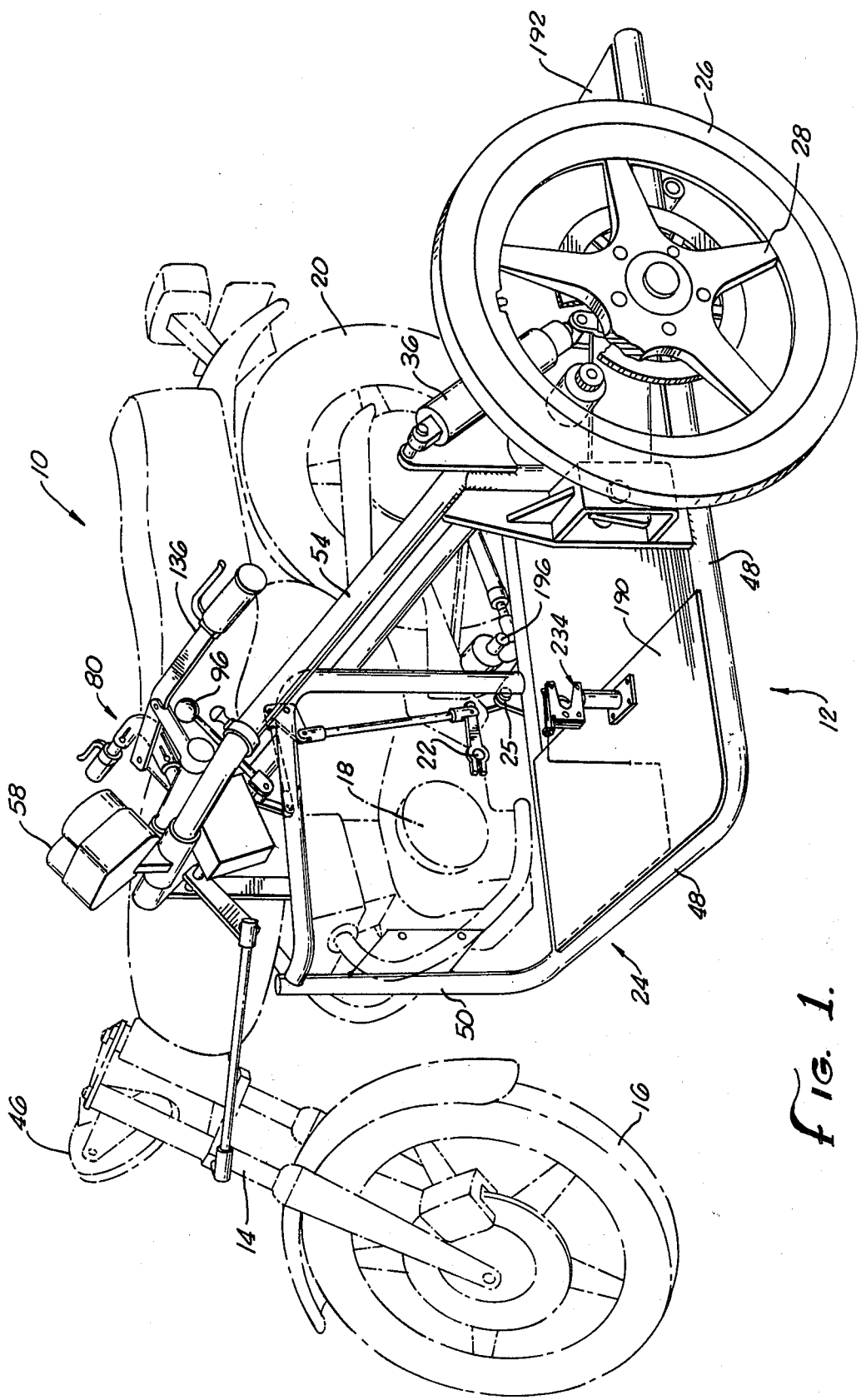
FIG. 1 is a perspective view of the apparatus of this invention, showing the sidecar as it is attached to the motorcycle, (the motorcycle is shown in shadow).
Figure 2:
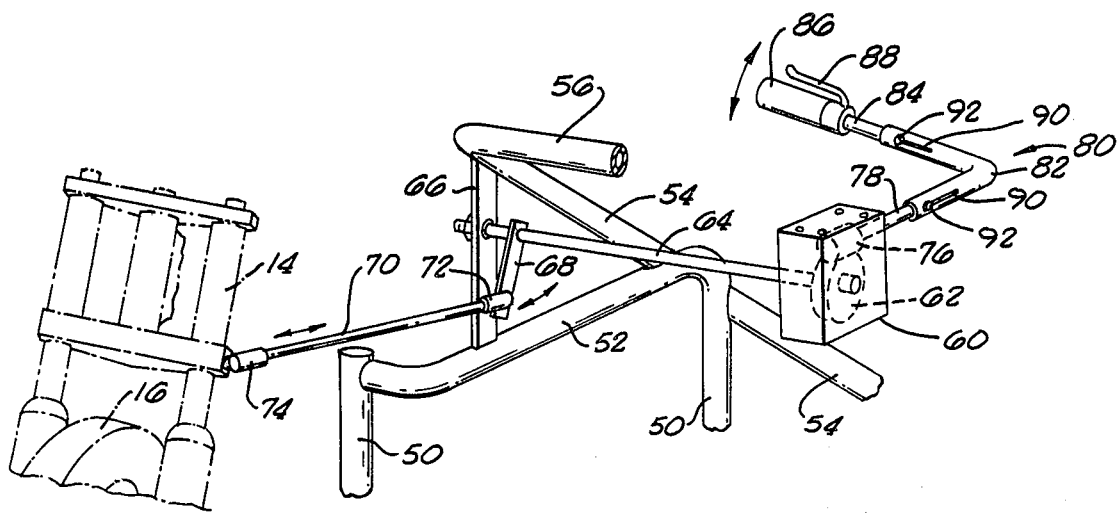
FIG. 2 is an isolated view, in perspective, of the steering mechanism of this invention, showing how rotary motion of the steering bar is communicated via the worm and rotary gears to the front fork assembly of the motorcycle to turn the front fork assembly from side to side.

The preferred embodiment of the apparatus of this invention comprises a conventional motorcycle, generally designated 10, and the sidecar, generally designated 12.

The motorcycle will have a front fork assembly 14 to which the front wheel 16 is attached, an engine 18 and a rear wheel 20. The motorcycle 10 has an automatic transmission (not shown) which is customarily activated by means of a foot gear shift 22.

The sidecar 12 has a main frame 24 constructed preferably out of tubular steel for the combination of strength and light weight. The frame 24 is attached to the motorcycle 10 at certain points by conventional nuts and bolts means 25. The sidecar 12 is outfitted with a wheel 26. The wheel has a hub 28 and is journaled to a rocker arm 30. The rocker arm 30 is pivotally attached to bracket 32 by means of pin 34. Bracket 32 is fixedly attached to the main frame 24. A shock absorber 36 is attached at one end to rocker arm 30 by means of pin 38 in bracket 40, and is attached at its other end to the main frame 24 by means of pin 42 in bracket 44.

The conventional handle bars and other paraphernalia traditionally located on the front fork assembly 14 have been removed from the motorcycle 10 leaving only the headlight 46.

All of the instrumentation and controls normally located on the front fork assembly 14 of the motorcycle 10 have been positioned on the sidecar 12.

Turning now to the construction of the sidecar 12, the main frame system 24 is constructed in a chariot-like design, having a U-shaped floor bar 48 with the open end of the U facing rearwardly relative to the motorcycle. Three side bars 50 extend upwardly perpendicular from the floor bar 48, two from the approximate center of the lateral sides of the U-shaped floor bar 48, and a third side bar 50 extending upwardly from the right front corner of the floor bar 48. A horizontal support bar 52 extends between the two side bars 50 which are located on the side of the sidecar 12 nearest the motorcycle 10. Angleing upwards from the rear of the sidecar 12 to the front of the sidecar 12 are angle bars 54. Angle bars 54 are joined by head bar 56 at the front of the sidecar 12. Head bar 56 is positioned such that the wheelchair occupant, when riding in the sidecar 12, will have visual and manual proximity to instrumentation and controls located on or near head bar 56. As seen in FIG. 1, the instrumentation 58 which is normally located on the handle bars of a conventional motorcycle is attached by conventional means to head bar 56 and positioned for easy viewing by the wheelchair occupant.

The steering mechanism is also located on the sidecar whereby the wheelchair occupant can control the direction of the motorcycle/sidecar apparatus. The conventional handle bars of the motorcycle are completely removed, leaving the bare front fork assembly 14. The steering of the sidecar motorcycle apparatus is now accomplished by means of a steering mechanism which is located on the sidecar 12 itself. A gear box 60 is attached to the underside of head bar 56 in a centrally located position. The gear box 60 may be attached to head bar 56 by any conventional means such as U-bolts and nuts. Housed within gear box 60 is a gear 62. Gear 62 is fixedly attached to shaft 64 which extends exteriorally of gear box 60 toward the side of the sidecar 12 which is attached to the motorcycle 10. There, at its distal end, shaft 64 is journaled in journal plate 66 which extends between horizontal support bar 52 and the angle bar 54. Rotary movement of gear 62 causes a like rotation of gear shaft 64. Located interiorally of journal plate 66 and attached fixedly to gear shaft 64 is a straight plate 68. Rotational movement of gear shaft 64 causes a like movement of straight plate 68. A linkage rod 70 is attached at its first end to straight plate 68 by means of clevis 72. The attachment means is such that rotational movement of gear 62 will cause a linear movement of linkage rod 70. A second or distal end of linkage rod 70 is attached to the front fork assembly 14 by means of a movable eyelet and pin assembly 74. Accordingly, rotational movement of gear 62 will be communicated to the front fork assembly 14 to cause front fork assembly 14 to pivot from side to side thereby controlling the positioning of the front wheel 16 which will in turn control the direction of the motorcycle/sidecar apparatus.

Also located within gear box 60 is a worm gear 76. Worm gear 76 interdigitates with gear 62 such that turning worm gear 76 causes gear 62 to rotate. Fixedly attached to worm gear 76 is steering column 78. Steering column 78 extends exteriorally of gear box 60. Adjustably attached to steering column 78 is steering bar 80. Steering bar 80 comprises an adjustment sleeve 82 and a handle bar 84. On the end of handle bar 84 is a hand grip 86. A keeper bar 88 is fixed to hand grip 86 and acts as a restraining device to retain the quadraplegic's hands on the steering bar 80. The position of the steering bar 80 is made adjustable by means of adjustment slots 90 formed in each end of the adjustment sleeve 82. Set screws 92 or other conventional bolt means allow the handle bar 84 and the steering column 78 to be adjusted relative to adjustment sleeve 82. The adjustment sleeve 82 should be set upon steering column 78 such that the handle bar 84 extends toward the motorcycle and is in a roughly horizontal position when the front wheel 16 of the motorcycle 10 is centrally located. It has been found that a gear ratio of the worm gear 76 to the gear 62 of approximately $7\frac{1}{2}$ to 1 is suitable for providing for proper steering control with the steering bar 80. It will be appreciated that with this mechanism, the wheelchair occupant in the sidecar can control the direction of the motorcycle sidecar apparatus by movement of the steering bar 80 in a rotary movement through a minimal arc will control the direction in which the motorcycle sidecar apparatus will travel.

Figure 7:
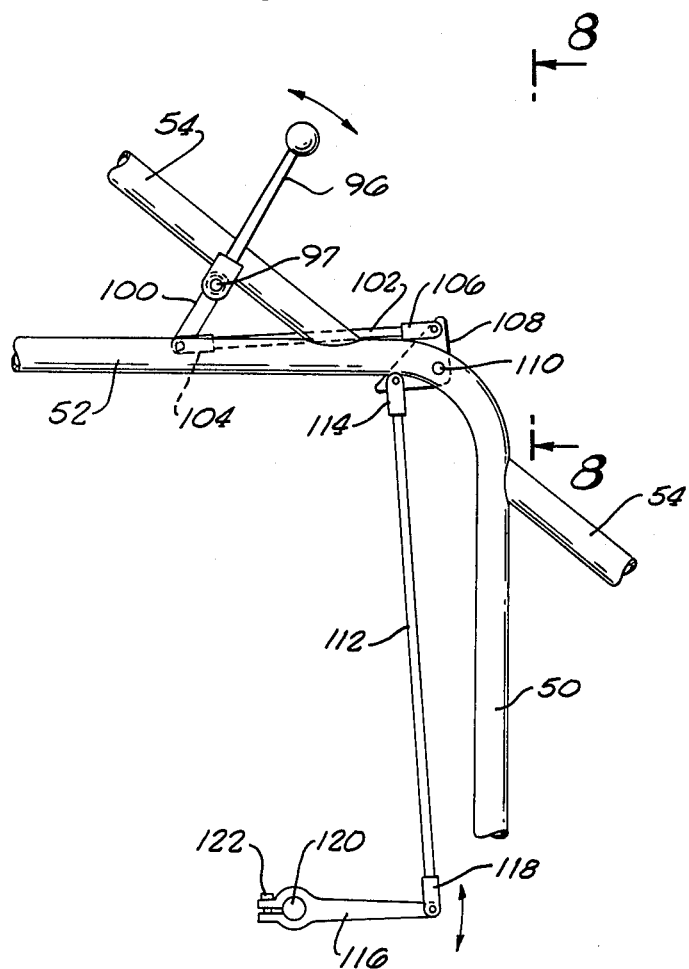
FIG. 7 is a side view in isolation of the gear shift mechanism whereby the floor shift lever for the motorcycle is activated from the sidecar.
Figure 8:
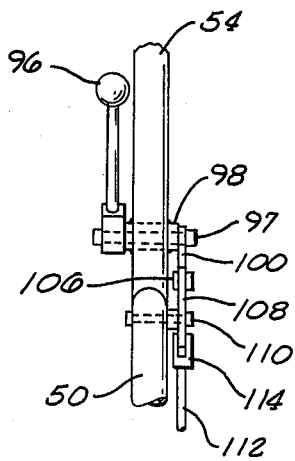
FIG. 8 is an end view shown along lines 8—8 in FIG. 7 showing how the shift control lever is journaled through the frame of the sidecar as well as the connective linkage.

Turning now to FIG. 7, the mechanism by which the automatic transmission is engaged is disclosed. On the typical motorcycle having an automatic transmission, the transmission is engaged by means of a foot shift. On the sidecar motorcycle apparatus, it is necessary that the gear shift control be located on the sidecar in close proximity to the elbow of the wheelchair occupant so that the transmission may be engaged or disengaged with the elbow of the wheelchair occupant. In the preferred embodiment, the shift control lever 96 is fixedly attached to a pin 97 which is journaled through bushing 98 which is fixedly attached to the underside of angle bar 54. Swing arm 100 is rotatably attached to pin 97 at the other side of bushing 98. Swing arm 100 is in turn attached to linkage 102 by means of clevis 104. The other end of linkage 102 is attached by means of clevis 106 to the pivot plate 108. Pivot plate 108 is journaled upon a pin 110 which extends through the horizontal support bar 52. Pivot plate 108 is shaped as an isosceles triangle, with pin 110 being located at the apex of that triangle, and clevis 106 attached at the upper base angle of that triangle. At the lower base angle, a second linkage 112 is attached by means of clevis 114. Linkage 112 extends the distance from pivot plate 108 to the arm clamp 116 to which linkage 112 is attached by means of clevis 118. Arm clamp 116 is fixedly attached to the shifting peg 120, from which the foot shift has been removed, by means of a conventional attachment means such as an adjustable orifice in arm clamp 116 and a bolt 122 to reduce the orifice size to tightly grasp shifting peg 120.

By means of this mechanism, moving the shift control lever 96 forward or backward will cause arm clamp 116 to be raised or lowered thereby engaging or disengaging the automatic transmission of the motorcycle. It should be noted that the shift control level 96 is large and positioned near the elbow of the wheelchair occupant in the sidecar such that minimal effort and movement capabilities are required by the quadriplegic to engage or disengage the transmission.

Figure 9:
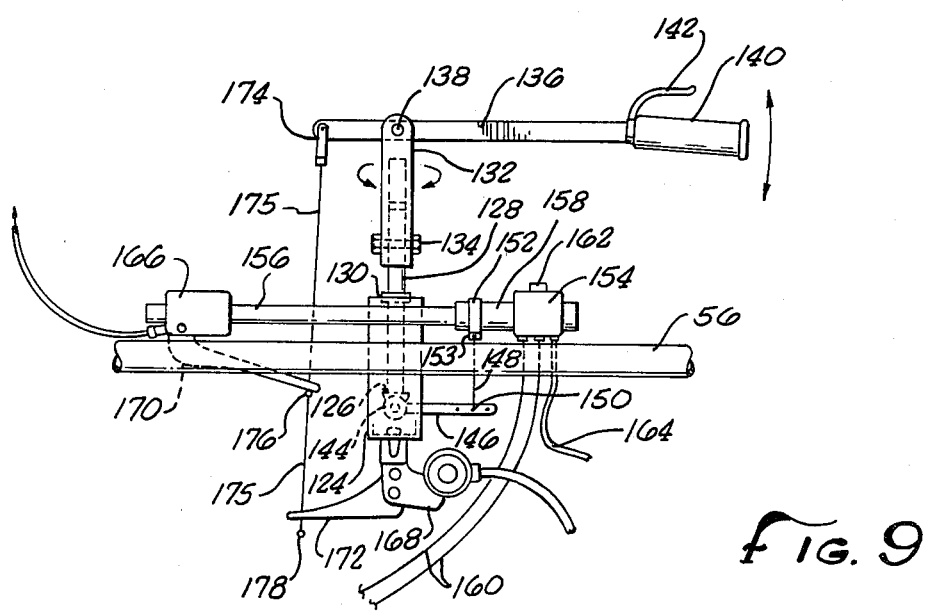
FIG. 9 is a plan view, in isolation, of the brake and throttle control mechanism which is attached to the frame of the sidecar. This view shows how the main actuating bar controls, via rotational movement, the throttling of the motorcycle, and via lateral or pivotal motion, the braking of the motorcycle.

Turning now to FIG. 9, the mechanism by which the throttling and braking functions of the apparatus are controlled is disclosed. Attached to head bar 56 is a second gear box 124. This gear box may be separate and distinct from the gear box 60 which houses the worm and rotary gears in the steering mechanism, or may be contiguous therewith, or, may be constructed so as to include both gear boxes as one. Housed within gear box 124 is a first beveled gear 126. Fixedly attached to first beveled gear 126 is throttle arm 128. Throttle arm 128 is freely rotatable within gear box 124 and is journaled through an aperture 130 in gear box 124 and extends exteriorally thereof. An adjustment sleeve 132 fits upon the end of throttle arm 128 via an aperture formed in adjustment sleeve 132 such that the amount by which throttle bar 128 is inserted into sleeve 132 may be varied. A conventional nut and bolt 134 extend through aligned apertures in sleeve 132 and throttle bar 128 to secure sleeve 132 in position relative to throttle bar 128. At the distal end of sleeve 132, main actuating bar 136 is pivotally attached by means of pin 138. The means of attachment will allow the main actuating bar 136 to move unrestrictedly through at least a 30 degree arc in a horizontal plane. The attachment means by which main actuating bar 136 is attached to sleeve 132 is also such that rotational movement of actuating bar 136 through a vertical plane will be directly communicated to sleeve 132 and cause a like rotation of sleeve 132. In the preferred embodiment, this attachment means comprises a longitudinal slot formed in the distal end of sleeve 132 into which main actuating bar 136 may slide. Main actuating bar 136 is retained within the slot by means of pin 138. It will be noted that actuating bar 136 is attached to sleeve 132 at a point near but removed from the one end of bar 136. As will be described in greater detail below, this is intended to allow sleeve 132 to act as a fulcrum for bar 136.

At the distal end of bar 136, a hand grip 140 and hand grip clamp 142 are attached. Hand grip 140 performs no other function other than providing a place for the wheelchair occupant to rest one of this hands. The hand control clamp 142 aids the quadraplegic in keeping his hand on the actuating bar 136.

Returning to gear box 124, a second beveled gear 144 interdigitates with first beveled gear 126. Attached to second beveled gear 144 is a throttle bar 146 which extends exteriorally and to the side of gear box 124. Wire 148 is attached to throttle bar 146 through an aperture 150 in throttle bar 146. The other end of wire 148 is attached to a circular clamp 152 by means of an aperture in a flange 153 extending above the clamp 152. The clamp 152 is clamped onto the conventional throttle control 154 of the motorcycle, which has been relocated onto attachment bar 156. Throttle control 154 is of the twist-type whereby the grip portion 158 of the throttle control 154 is twisted about its central axis to increase or decrease the amount of fuel which is supplied to the carburetor of the motor of the motorcycle 10. In this mechanism, movement of the main actuating bar 136 in a rotary movement through a vertical plane will cause adjustable sleeve 132 and throttle bar 128 to rotate. The rotation is communicated to first beveled gear 126 and hence to second beveled gear 144 and to throttle bar 146. Movement of throttle bar 146 is through a horizontal plane. This movement causes clamp 152 to be pulled or released, causing the grip 58 of the throttle control 154 to twist, thereby operating the throttle. Throttle cables 160 transmit the signal to the carburetor. Also included in the throttle control is the high beam and low beam selector for the headlight of the motorcycle. The selection is made via switch 162 and leads 164 convey signal to the headlight.

The braking function for the motorcycle sidecar apparatus is also controlled by the actuating bar 136. The conventional hand brake controls 166 and 168 of the motorcycle consist of hand depressed levers 170 and 172 which activate the brakes. On the sidecar, the brake controls 166 and 168 are relocated onto the attachment bar 156 and to the gear box 124 such that there is lineal alignment between the levers 170 and 172. A small hole is drilled through the end of each of the levers 170 and 172. A wire 175 extending from the proximal end of actuating bar 136 to which the wires is attached by means of a clevis 174 extends through the apertures in the levers 170 and 172. Stops 176 and 178 are fixedly attached to the wire on the side of the levers 170 and 172, respectively, opposite that of the actuating bar 136 such that when the wire 175 is pulled through the apertures in the levers 170 and 172, the stops 176 and 178 engage the levers 170 and 172 and cause them to be depressed. It will be noted that the stop 178 is not located directly against the lever 172 in the rest position, as is stop 176 vis a vis lever 170 as shown in FIG. 9. This allows the rear brake control 166 to be activated before the front brake control 168. This provides for a more sure, more stable and a safer slowing of the motorcycle by applying the rear brake first. It will be appreciated that this mechanism allows for the main actuating bar 136 and sleeve 132 to act as a bar and fulcrum whereby pivotal movement of actuating bar 136 through the horizontal plane will cause the brake control levers to be depressed thereby applying the brakes and slowing the speed of the motorcycle sidecar apparatus. Again, this pivotal motion of the actuating bar 136 can easily be accomplished by a quadraplegic who has minimal elbow flex capabilities.

The sidecar is also outfitted with a mechanism to allow the motorcycle sidecar apparatus to move in a rearward direction. This is required to have full maneuverability.

Figure 3:
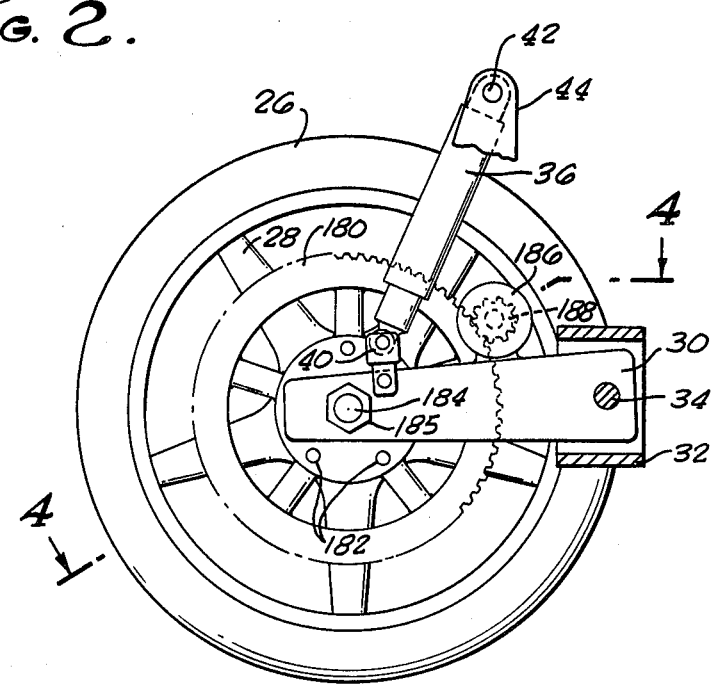
FIG. 3 is a side view of the wheel of the sidecar. The ring gear is shown attached to the hub of the wheel. The electric motor and gear which operate to turn the wheel and hence the sidecar in a rearward direction are also shown.
Figure 4:
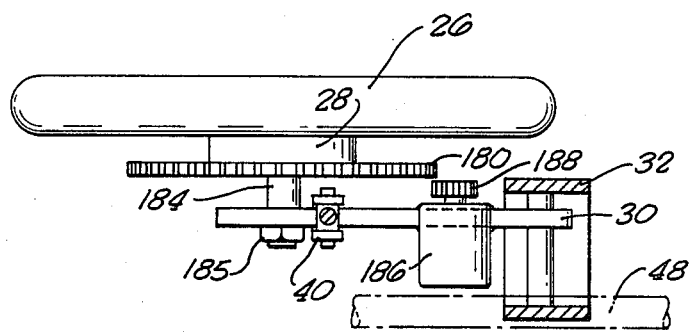
FIG. 4 is a top view taken along lines 4—4 in FIG. 3, showing the manner in which the ring gear and electric motor gear are situated.

Turning to FIGS. 3 and 4, the wheel 26 of the sidecar 12 has a hub 28. A ring gear 180 is attached to hub 28 by means of bolts 182. Ring gear 180 is concentric with wheel 26. Both rotate freely about axle 184. Axle 184 is journaled upon swing arm 30. Swing arm 30 is pivotally attached to the sidecar by means of pin 34 which is attached to bracket 32. The wheel is retained on the axle 184 by means of nut 185 which threadably engages the end of axle 184. An electric motor 186 is fixedly attached to swing arm 30. The electric motor 186 is equipped with a rotary gear 188 which will extend to engage ring gear 180 when the electric motor 186 is operated. The gear 188 will turn in a direction to cause the tire 26 to turn in a rearward direction thereby causing the entire sidecar motorcycle apparatus to travel in a rearward direction. The control (not shown) for actuating the electric motor 186 is located on the sidecar 12 in easy reach of the quadraplegic.

The sidecar 12 is equipped with means to allow the wheelchair (not shown) to roll easily onto the sidecar. Looking at FIGS. 5 and 6, the U-shaped floor bar 48 provides the superstructure for the front floor portion 190, hinged floor plate 192 and the connecting mechanism by which floor plate 192 is raised and lowered. The front floor portion 190 is fixedly attached to the U-shaped floor bar 48. The floor plate 192 is pivotally attached to floor portion 190 by means of hinges 194. The hinges 194 allow the floor plate 192 to swing down from its up position parallel with floor portion 190 to its down position in which the rear portion of floor plate 92 rests upon the ground, in which position floor plate 192 acts as a ramp up which the wheelchair may travel. The means by which floor plate 192 is raised and lowered between these two positions comprises a 12-volt electric motor 196 which is attached to the undercarriage of the motorcycle. The control (not shown) for this motor is located on the sidecar, within easy reach of the wheelchair occupant. Electric motor 196 causes plunger 198 to either distend towards the rear of the motorcycle or contract, being pulled back towards the front of the motorcycle. At the distal end of plunger 198, a rocker arm 200 is attached by conventional nut and bolt means 202. Rocker arm 200 is fixedly attached at its other end to L-bar 204. L-bar 204 is supported by and rotatable in bushings 206 in the bar 48. A crossbar 208 is fixedly attached to the distal end of L-bar 204. The other end of crossbar 208 is supported in a second L-bar 210 which is similarly supported by and rotatable in bushing 212. Notches 214 and 216 have been formed in floor plate 192 to provide space for clearance when the floor plate 192 is lowered below the bar 48. Rollers 218 are attached at two places on crossbar 208 to facilitate raising and lowering of floor plate 192. Looking at FIG. 6, it will be seen that when plunger 198 is in the retracted position, the rocker arm 200 twists L-bar 204 such that crossbar 208 is pulled up, bringing the floor plate 192 into position parallel with the floor portion 190. When plunger 198 is extended, rocker arm 200 rotates L-bar 204 such that the crossbar 208 is lowered, allowing floor plate 192 to drop down until its rear portion rests on the ground so that floor plate 192 can then act as a ramp. Two support plates 220 are attached to the underside of floor plate 192 in that area upon which rollers 218 contact to provide a better weight supporting surface.

Means are provided for locking the floor plate 192 in the up position. This comprises two opposing locking rods 222 which are attached to a centrally located pull arm 224, which is rotatably attached to the underside of floor plate 192 near the rear portion of floor plate 192. The distal ends of the locking rods 222 are supported by brackets 226 which are attached to the underside of floor plate 192. The locking rods 222 are slidable within brackets 226. A choke cable 228 is attached to one end of pull arm 224. Pulling or pushing on the choke cable 228 will cause pull arm 224 to rotate, in turn causing the locking rods 222 to extend or contract. A pull ring control 230 for the choke cable 228 is located on the sidecar within easy reach of the wheelchair occupant. Apertures 232 in frame bar 48 receive the ends of locking rods 222 when the floor plate 192 is in the up position, parallel to front floor portion 190, and the locking rods are caused to distend by pushing the choke cable control 230 down, thereby locking floor plate 192 into that position.

Figure 10:
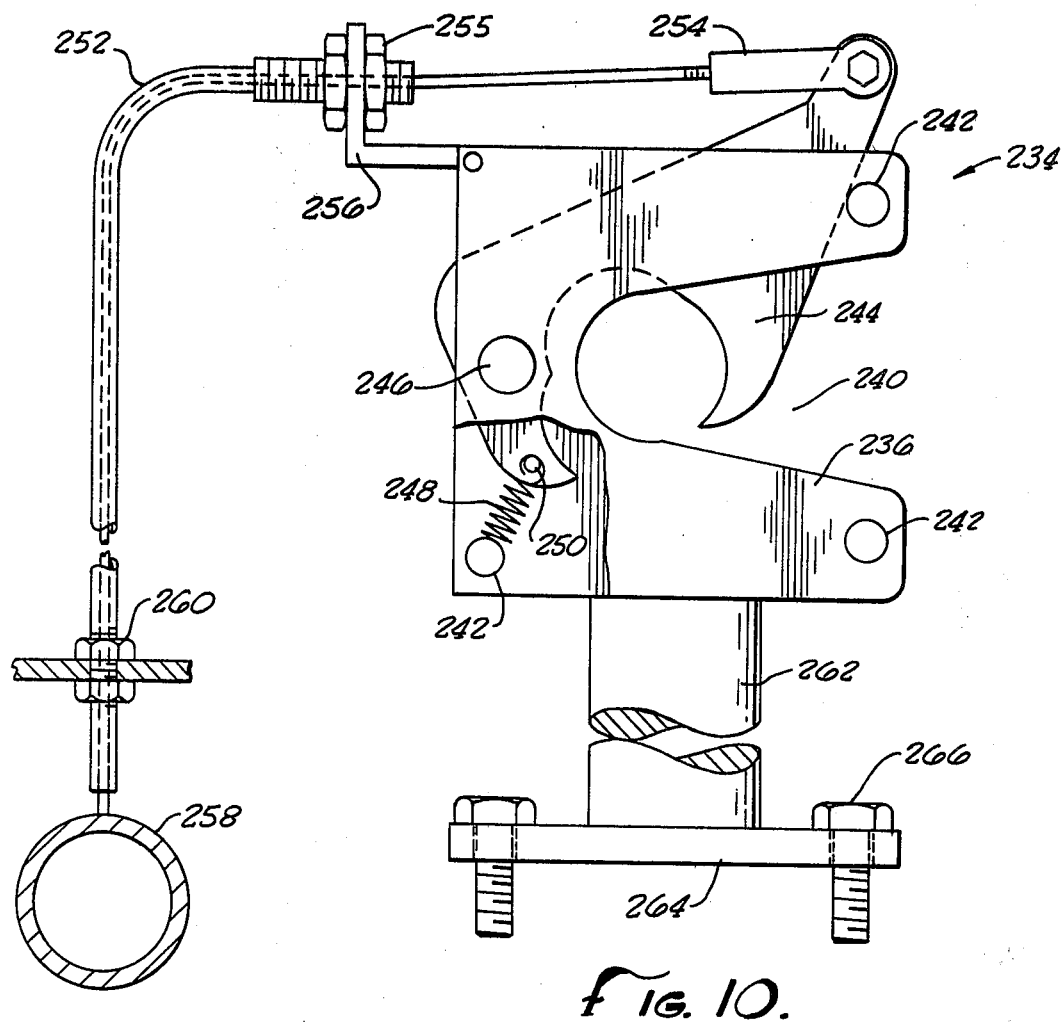
FIG. 10 is a side view of the locking mechanism whereby the wheelchair is locked into the sidecar.
Figure 11:
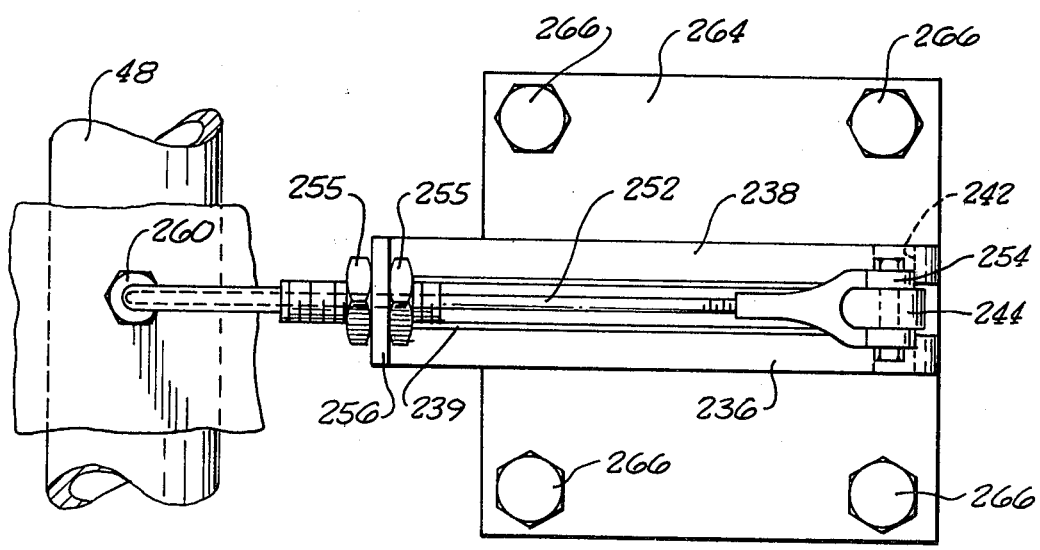
FIG. 11 is a top view of the locking mechanism shown in FIG. 10, along line 11—11.

To provide for added safety of the wheelchair occupant during operation of the motorcycle/sidecar apparatus, a locking device 234 is provided to grasp the wheelchair securely during operation. Looking at FIGS. 10 and 11, a simple latch device is provided which will grasp a central bar (not shown) on the wheelchair when the wheelchair is in position in the sidecar. The locking device 234 comprises a pair of parallel plates 236 and 238 which define a space 239 between them. A slot 240 is formed in each of the plates 236 and 238. The slot 240 is sufficiently large for easy insertion of the central bar on the wheelchair. The plates 236 and 238 are held in position relative to one another by means of pins 242. The space 239 between plates 236 and 238 is occupied by latch member 244 which is rotatable upon journal pin 246. Latch member 244 is designed to engage and hold the central bar of the wheelchair securely within slot 240 when latch member 244 is in the down position. A spring 248 which extends between pin 242 and pin 250 on latch member 244 biases the latch member 244 to the down position. Latch member 244 is raised to the open position by a means of a choke cable 252 which is attached to latch member 244 by means of clevis 254. The housing portion of choke cable 252 is secured by nuts 255 to flange 256 which extends from plates 236 and 238. The pull ring 258 for the choke cable 252 is attached to the sidecar by nuts 260 in close proximity to the wheelchair occupant. The plates 236 and 238 are securely attached to the floor portion 190 by means of bar 262, plate 264 and nut and bolt means 266.

Looking at FIG. 1, it is seen that the locking device 234 is positioned on the front floor portion 190, near the floor plate 192. The positioning of locking device 234 should be such that the wheelchair occupant is comfortably close to the controls of the sidecar. The location of locking device 234 can be made adjustable by any suitable means; for example, placing slots in the floor portion 190 through which the nut and bolt means 266 are positioned.

Although a detailed description of the preferred embodiment of this invention has been provided, it would be clear to someone skilled in the art that many modifications upon these described herein are possible without departing from the inventive concepts embodied therein. Accordingly, this invention is not to be limited to the preferred embodiment set forth above, but is of the full breadth and scope of the appended claims.

What is claimed:

1. A handicapped driven apparatus comprising:
   (a) a motorcycle having a front fork assembly, an automatic transmission and conventional hand brake and throttle controls;
   (b) a side car designed and constructed to accommodate therein a conventional wheelchair and occupant, said sidecar attached to said motorcycle;
   (c) means attached to said sidecar for control by the wheelchair occupant of the speed of the apparatus, said means comprising a main gear box attached to the sidecar, a pair of interdigitating gears housed within said gear box, a rotatable arm attached to a first gear of said gear pair such that rotational movement of said arm is communicated to said first gear and hence to the second gear of said gear pair, said arm extending out of said gear box toward the wheelchair occupant, a main actuating bar pivotally attached to said arm and within easy reach of the wheelchair occupant such that rotational movement of said actuating bar is communicated to said arm while pivotal movement of said actuating bar is not communicated to said arm, a throttle bar for communicating movement of said actuating bar to the throttle control of the motorcycle to control thereby the supply of fuel to the motorcycle, a linkage attached to the main actuating bar and to each of the hand brake controls, which controls are attached to the sidecar, such that pivotal movement of the actuating bar operates the brake controls, and
   (d) means attached to the sidecar and within each reach of the wheelchair occupant for controlling the direction of the apparatus and the transmission mode of the motorcycle.

2. The apparatus of claim 1 wherein said means for controlling the direction of the apparatus comprises:
   (a) a gear box attached to the sidecar;
   (b) a first rotary gear housed in said gear box;
   (c) a worm gear housed in said gear box, said warm gear interdigitating with said rotary gear;
   (d) a steering column attached at a first end to said worm gear and extending exteriorly of said gear box;
   (e) a steering bar attached to the second end of said steering column, such that rotational movement of said steering bar is communicated to said steering column, said steering bar being within easy reach of the wheelchair occupant, and
   (f) linkage means between said rotary gear and the front fork assembly of the motorcycle such that movement of said rotary gear is communicated to said front fork assembly to turn the front fork assembly.

3. The apparatus of claims 1 or 2 wherein said means for controlling the transmission mode of the motorcycle comprises a shift lever attached to the sidecar within easy reach of the wheelchair occupant and linkage means between said lever and the transmission peg on the motorcycle.

4. The apparatus of claims 1 or 2 wherein said sidecar has a floor upon which the wheelchair rides, said floor comprising a floor plate hinged to the front of said floor portion and means for raising and lowering the rear portion of said floor plate.

5. The apparatus of claim 4 wherein said means to raise and lower said floor plate comprises an electric motor attached to said motorcycle; linkage means between said electric motor and said floor plate; and means attached to said sidecar within easy reach of the wheelchair occupant for activating said electric motor.

6. The apparatus of claim 4 wherein said linkage means between said electric motor and said floor plate comprises a plunger which is attached to said electric motor and which is caused to distend or contract upon operation of said electric motor, said plunger pivotally attached to an L-bar which is disposed under said floor plate, said L-bar journaled through bushings in the floor.

7. The apparatus of claim 6 further comprising locking means for securing the floor plate in the raised portion.

8. The apparatus of claims 1 or 2 further comprising means for moving the sidecar in a rearward direction.

9. The apparatus of claim 8 wherein said means for moving the sidecar in a rearward direction comprise:
   (a) a wheel on said sidecar; and
   (b) means to turn said wheel in a rearward direction.

10. The apparatus of claim 9 wherein said means to turn said wheel in a rearward direction comprises:
    (a) a ring gear fixedly attached to said wheel;
    (b) an electric motor attached to the sidecar;
    (c) a gear attached to said motor which interdigitates with said ring gear; and
    (d) means located on the sidecar within easy reach of the wheelchair occupant to activate said electric motor.

11. A handicapped driven sidecar which is adapted to be attached to a conventional motorcycle, said motorcycle having at least two wheels, a front fork assembly to which the front wheel is attached, an automatic transmission, and conventional throttle and brake controls, the sidecar comprising:
    (a) a main frame assembly, said assembly sufficiently large to accommodate a conventional wheelchair and wheelchair occupant;
    (b) means for attaching said main frame assembly to the motorcycle;
    (c) a wheel rotatably attached to said main frame assembly;
    (d) means attached to the sidecar for controlling the speed of the motorcycle to which the sidecar is attached, said means comprising:
       (i) a main gear box attached to the sidecar;
       (ii) a pair of interdigitating gears housed within said gear box;
       (iii) an arm attached to a first gear of said gear pair;
       (iv) a main actuating bar located within easy reach of the wheelchair occupant and pivotally attached to said arm such that rotational movement of said bar is communicated to said arm, but pivotal movement of said bar is not so communicated;
       (v) throttle control means attached to the sidecar for communicating rotational movement of said main actuating bar to the throttle control of the motorcycle;
       (vi) brake control means attached to sidecar for communicating pivotal movement of said main actuating bar to the brake controls of the motorcycle.
    (e) means attached to the sidecar for controlling the lateral movement of the front fork assembly of the motorcycle; and
    (f) means attached to the sidecar for engaging the automatic transmission of the motorcycle.

* * * * *